US012700328B2

(12) United States Patent
Liu

(10) Patent No.: US 12,700,328 B2
(45) Date of Patent: Aug. 4, 2026

(54) CARD LEARNING MACHINE

(71) Applicant: Shican Liu, Anqing (CN)

(72) Inventor: Shican Liu, Anqing (CN)

( * ) Notice: Subject to any disclaimer, the term of this patent is extended or adjusted under 35 U.S.C. 154(b) by 189 days.

(21) Appl. No.: 18/883,057

(22) Filed: Sep. 12, 2024

(65) Prior Publication Data

US 2026/0065802 A1 Mar. 5, 2026

(30) Foreign Application Priority Data

Aug. 29, 2024 (CN) ......................... 202422105836.X

(51) Int. Cl.
*G09B 17/00* (2006.01)
*G09B 5/06* (2006.01)

(52) U.S. Cl.
CPC ........... *G09B 17/006* (2013.01); *G09B 5/062* (2013.01)

(58) Field of Classification Search
CPC .............................. G09B 5/062; G09B 17/006
See application file for complete search history.

(56) References Cited

U.S. PATENT DOCUMENTS

| | | | | |
|---|---|---|---|---|
| 4,729,564 A | * | 3/1988 | Kuna | A63F 9/183 |
| | | | | 463/31 |
| 4,731,027 A | * | 3/1988 | Phinney | G09B 3/00 |
| | | | | 434/169 |
| 4,997,374 A | | 3/1991 | Simone | |
| 5,055,053 A | * | 10/1991 | Hyman | G09B 7/06 |
| | | | | 273/455 |

| | | | | |
|---|---|---|---|---|
| 5,511,980 A | * | 4/1996 | Wood | G09B 1/04 |
| | | | | 434/167 |
| 5,556,283 A | * | 9/1996 | Stendardo | G09B 17/006 |
| | | | | 434/188 |
| 5,813,861 A | | 9/1998 | Wood | |
| 5,839,902 A | * | 11/1998 | Wood | G09B 29/106 |
| | | | | 434/130 |
| 7,717,714 B2 | * | 5/2010 | Wang | G09B 1/02 |
| | | | | 434/327 |
| 8,011,122 B2 | * | 9/2011 | Clegg | G11B 33/08 |
| | | | | 40/124.03 |
| 2005/0053907 A1 | * | 3/2005 | Liao | G09B 7/066 |
| | | | | 434/317 |
| 2005/0186547 A1 | * | 8/2005 | Yang | G09B 5/062 |
| | | | | 434/308 |
| 2014/0194036 A1 | * | 7/2014 | Heller | A63H 33/22 |
| | | | | 446/485 |
| 2018/0308373 A1 | | 10/2018 | Bogle et al. | |
| 2023/0368692 A1 | | 11/2023 | Chen | |

FOREIGN PATENT DOCUMENTS

| | | | | | |
|---|---|---|---|---|---|
| CN | 111465969 A | * | 7/2020 | .............. | G09B 5/06 |
| CN | 21719754 U | * | 8/2022 | | |

* cited by examiner

*Primary Examiner* — Dmitry Suhol
*Assistant Examiner* — Alyssa N Biancamano

(57) ABSTRACT

A card learning machine, in which the light generated by the light-emitting element can pass through the card, such that the identification part forms an identification projection for learning on the light-transmitting button. Through the provided bubble-shaped component, the card learning machine can interact with children, which can not only improve the fun of the learning process, enhance the attractiveness of the card learning machine, and improve the learning effect; but also, can train children's ability of touching and moving, further improving the learning effect.

13 Claims, 12 Drawing Sheets

A

B - B

1

CARD LEARNING MACHINE

CROSS REFERENCE TO RELATED APPLICATIONS

This application claims priority benefits to Chinese Patent Application No. 202422105836X, filed on Aug. 29, 2024, the contents of which is incorporated herein by reference.

TECHNICAL FIELD

The present disclosure relates to the technical field of learning toys, in particular, to a card learning machine.

BACKGROUND

There are various learning toys for children, and a card learning machine is one that enhances the fun of learning. The card learning machine mainly achieves the purpose of learning by inserting a card into the card slot, and further reading and broadcasting the content on the card.

SUMMARY

A card learning machine including: a card, including a light-transmitting plate and an identification part arranged on the light-transmitting plate, the identification part being capable of blocking a light penetrated from the light-transmitting plate; a housing, defined with a card slot, and an opening of the card slot penetrating a side wall of the housing for the card to be inserted; a circuit control component, arranged in the housing and connected to the housing, and the circuit control component being provided with a light-emitting element and a first switch; and an interactive component, arranged in the housing and connected to the housing, the interactive component including a light-transmitting button; one end of the light-transmitting button exposed from the housing and another end of the light-transmitting button connected to the first switch; the interactive component triggering the first switch in response to the interactive component being pressed. The identification part is located between the light-emitting element and the light-transmitting button; in response to the card being inserted into the card slot, the light generated by the light-emitting element is capable of sequentially passing through the light-transmitting plate and the light-transmitting button.

BRIEF DESCRIPTION OF THE DRAWINGS

The description and drawings that constitute a part of the present disclosure are provided for a further understanding of the present disclosure. The illustrative embodiments and their descriptions are provided for explanation but do not constitute improper limitations on the present disclosure.

2

Figure 7:
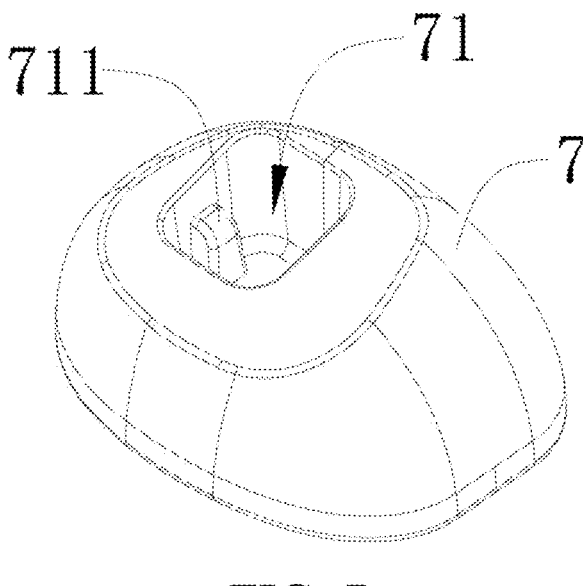

FIG. 7 is a schematic structural view of a support foot according to an embodiment of the present disclosure.

Figure 8:
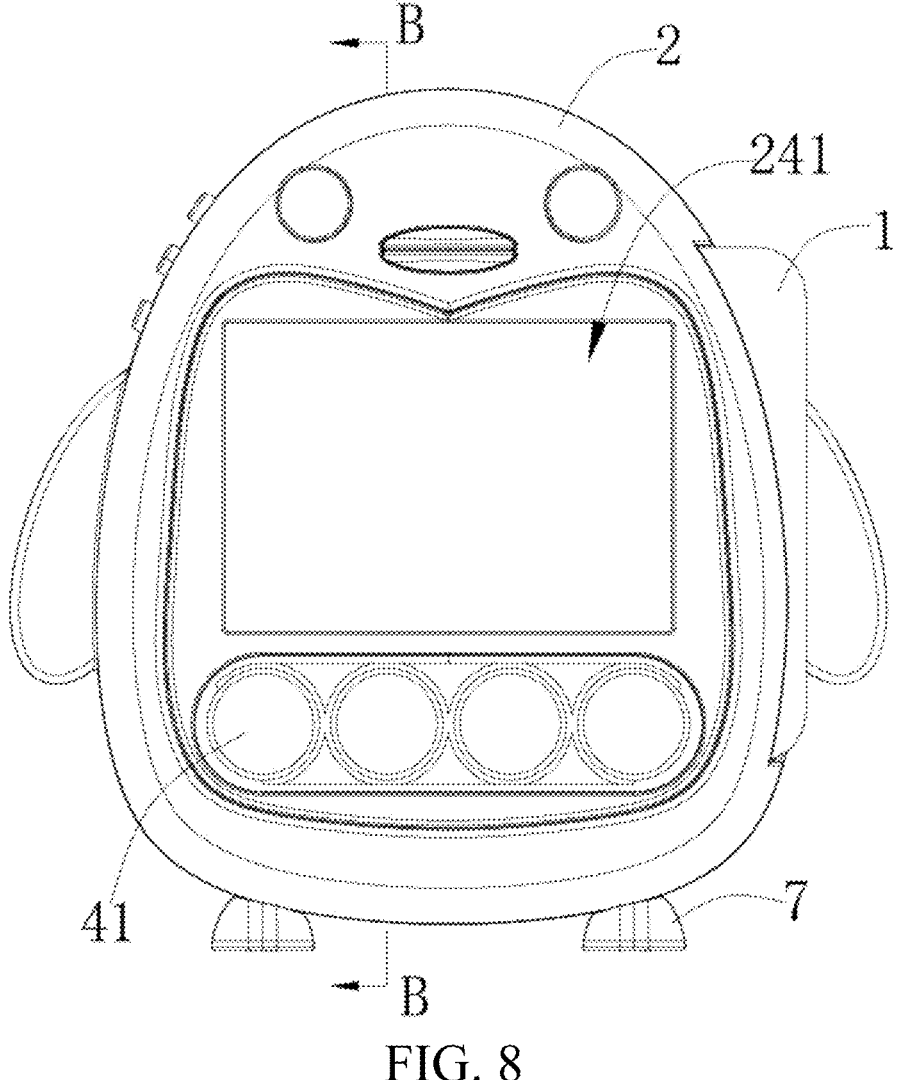

FIG. 8 is a front view of a card learning machine according to an embodiment of the present disclosure.

Figure 9:
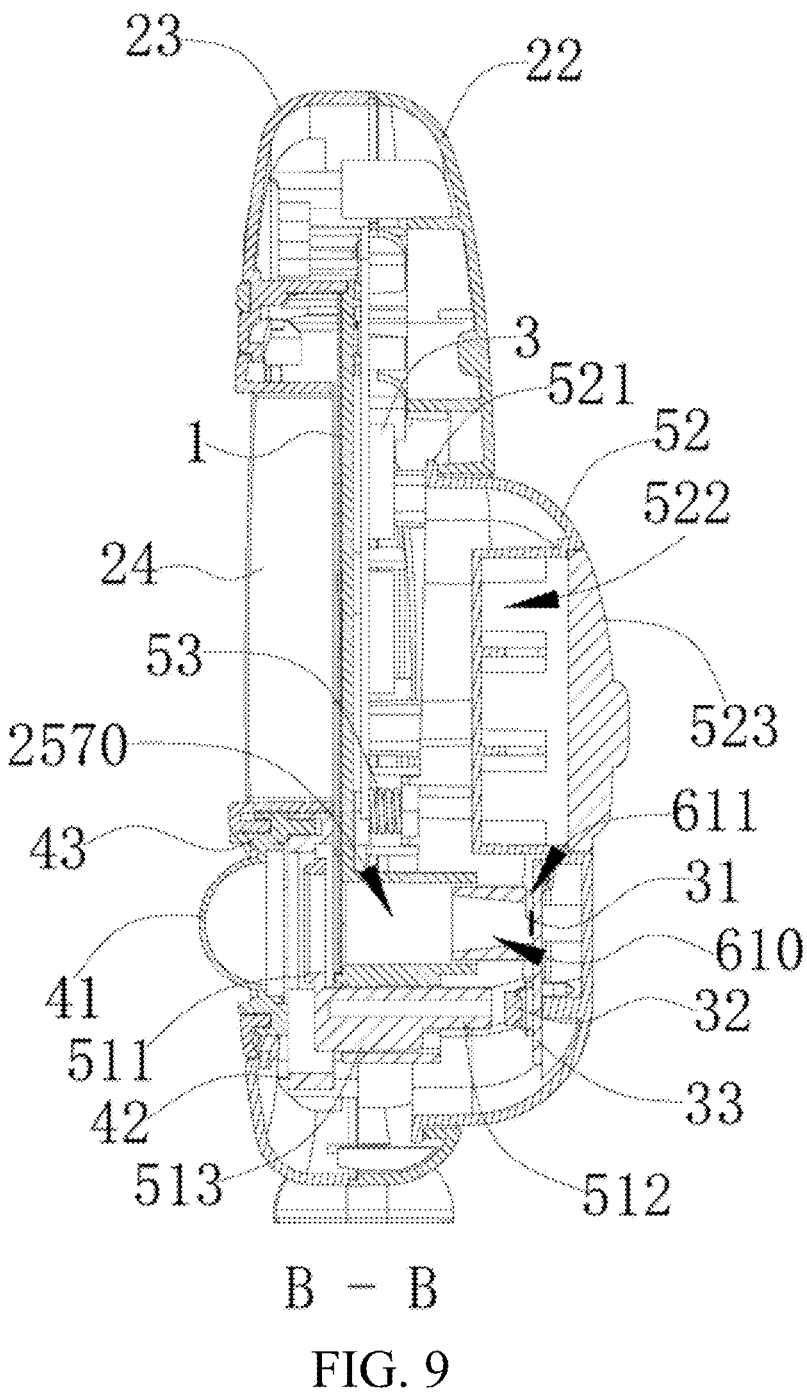

FIG. 9 is a sectional view of the structure in FIG. 8 along line B-B.

Figure 10:
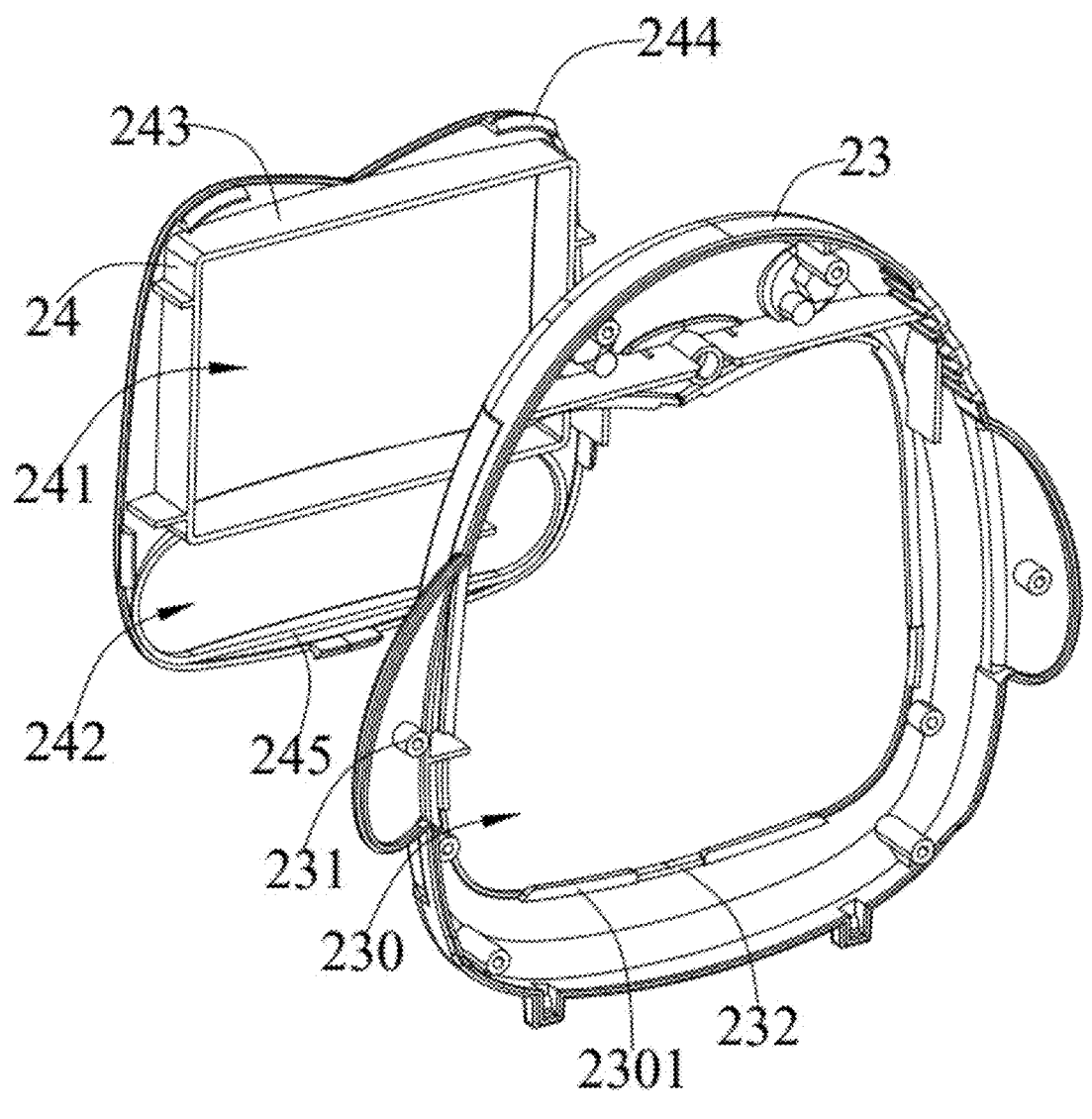

FIG. 10 is an exploded view of a second housing and a third housing according to an embodiment of the present disclosure.

Figure 11:
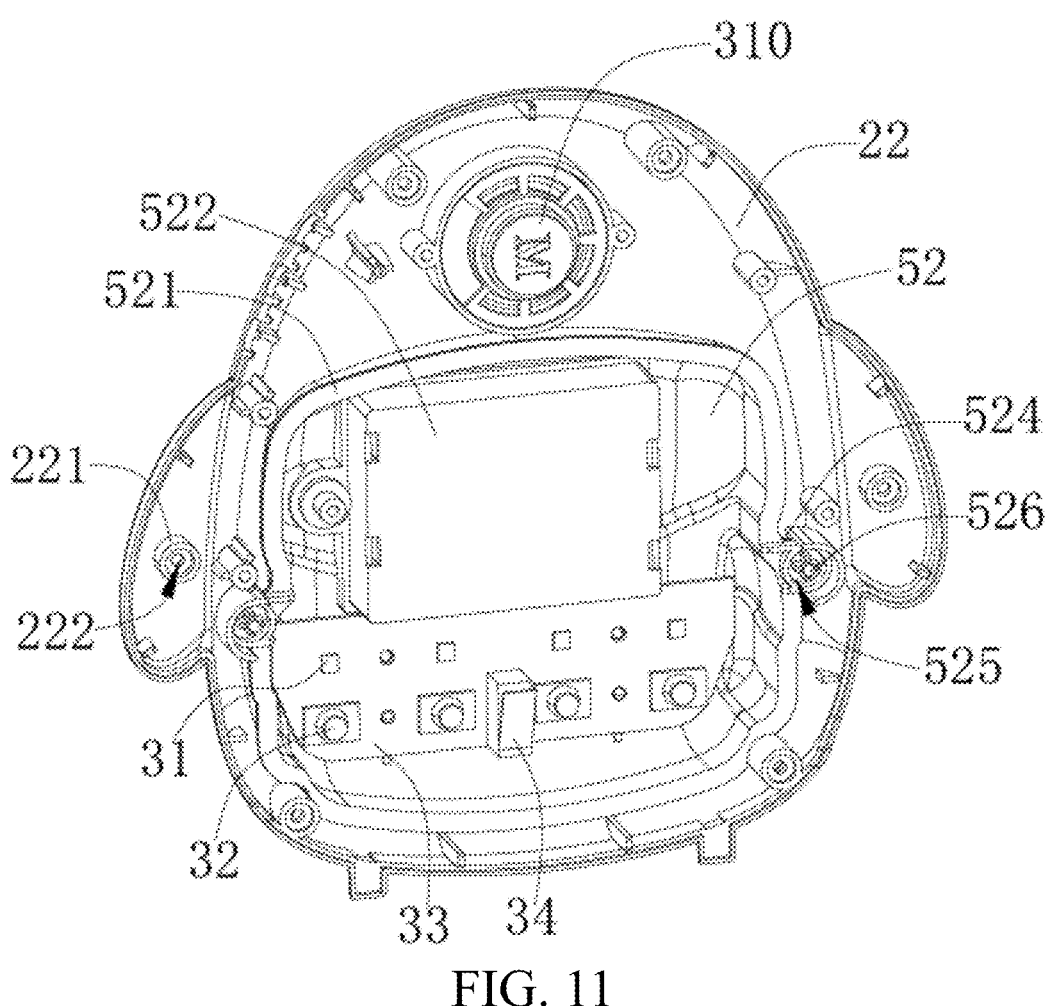

FIG. 11 is a schematic structural view of a first housing, a first circuit board and a battery according to an embodiment of the present disclosure.

Figure 12:
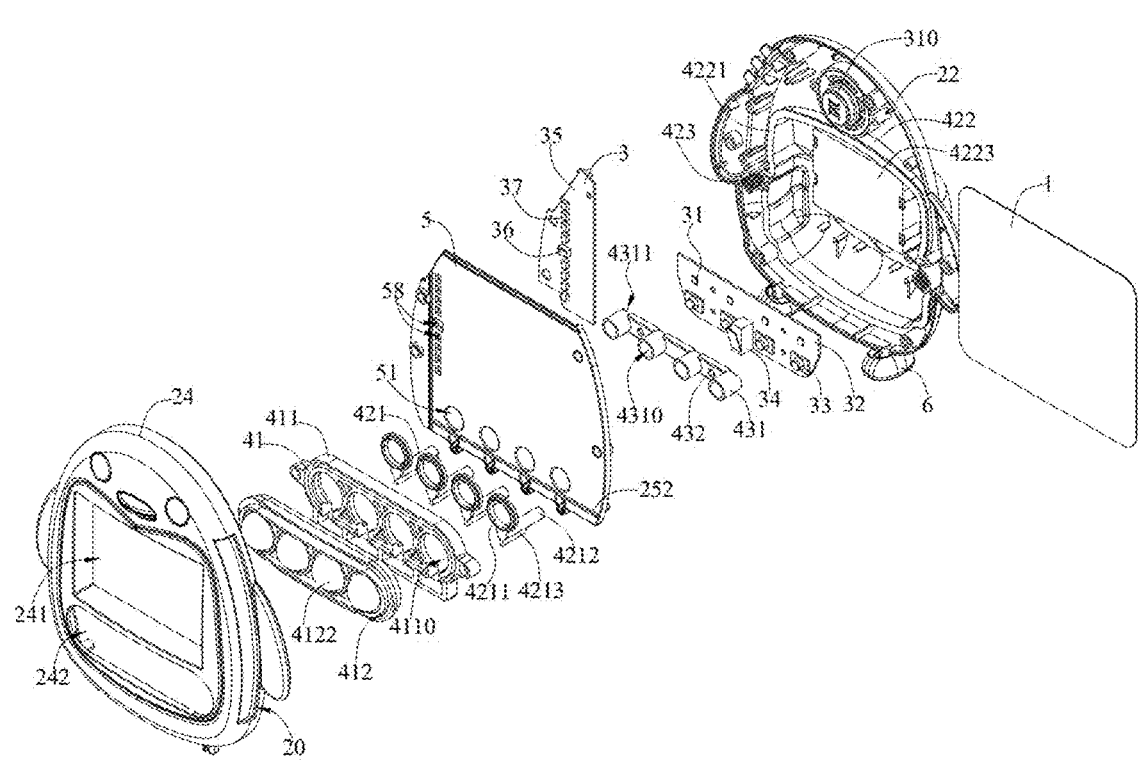

FIG. 12 is a schematic structural view of a first housing, a first circuit board and a battery compartment according to an embodiment of the present disclosure.

Figure 13:
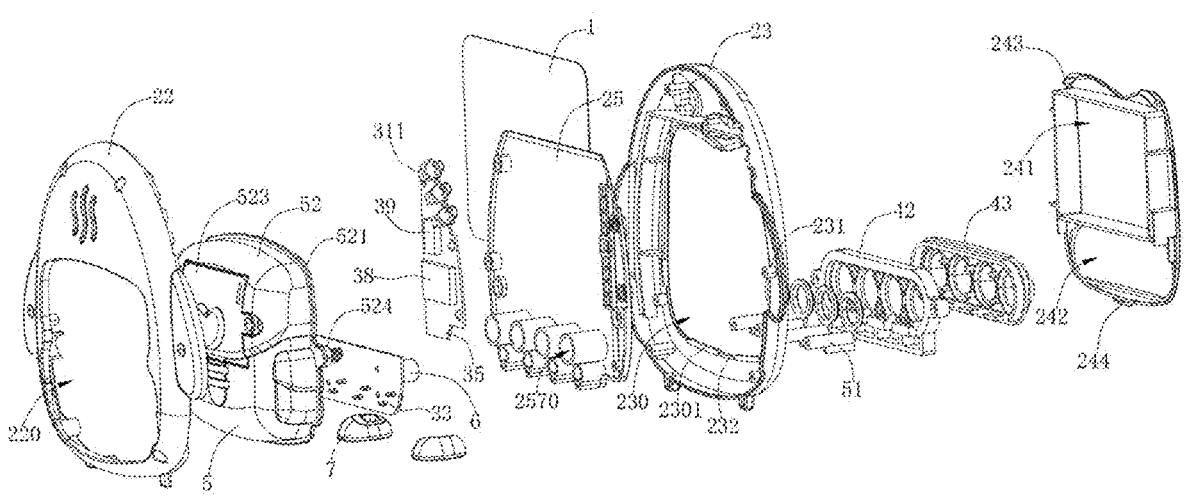

FIG. 13 is a schematic structural view of a first housing, a first circuit board and a battery compartment according to an embodiment of the present disclosure.

Figure 14:
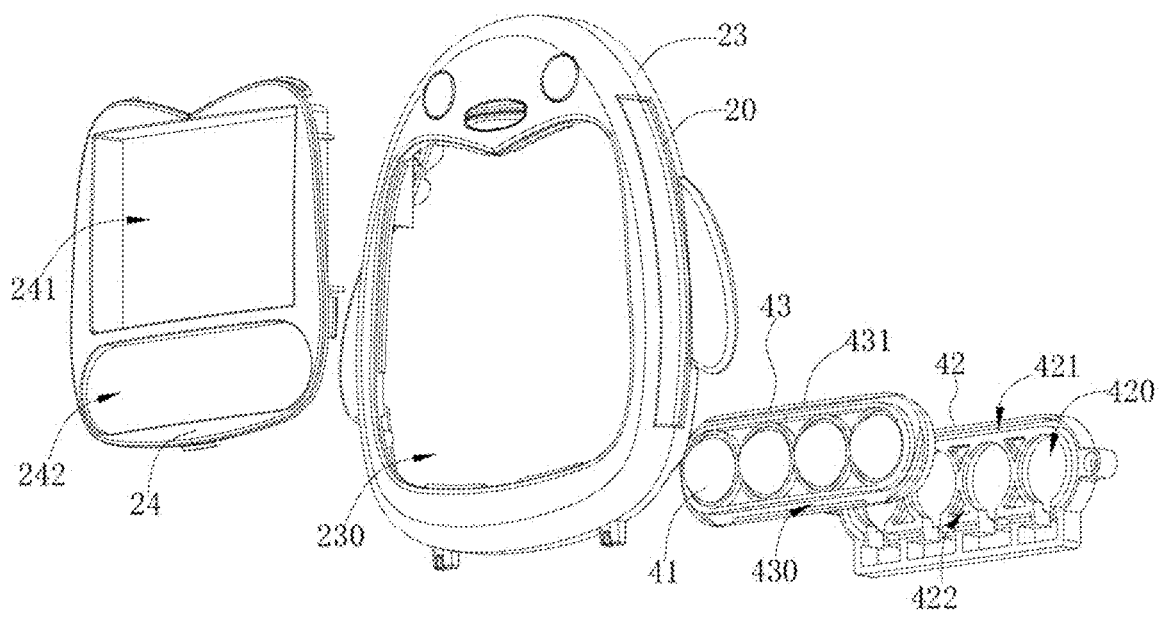

FIG. 14 is an exploded view of a second housing, a third housing and a bubble pressing component thereof according to an embodiment of the present disclosure.

Figure 15:
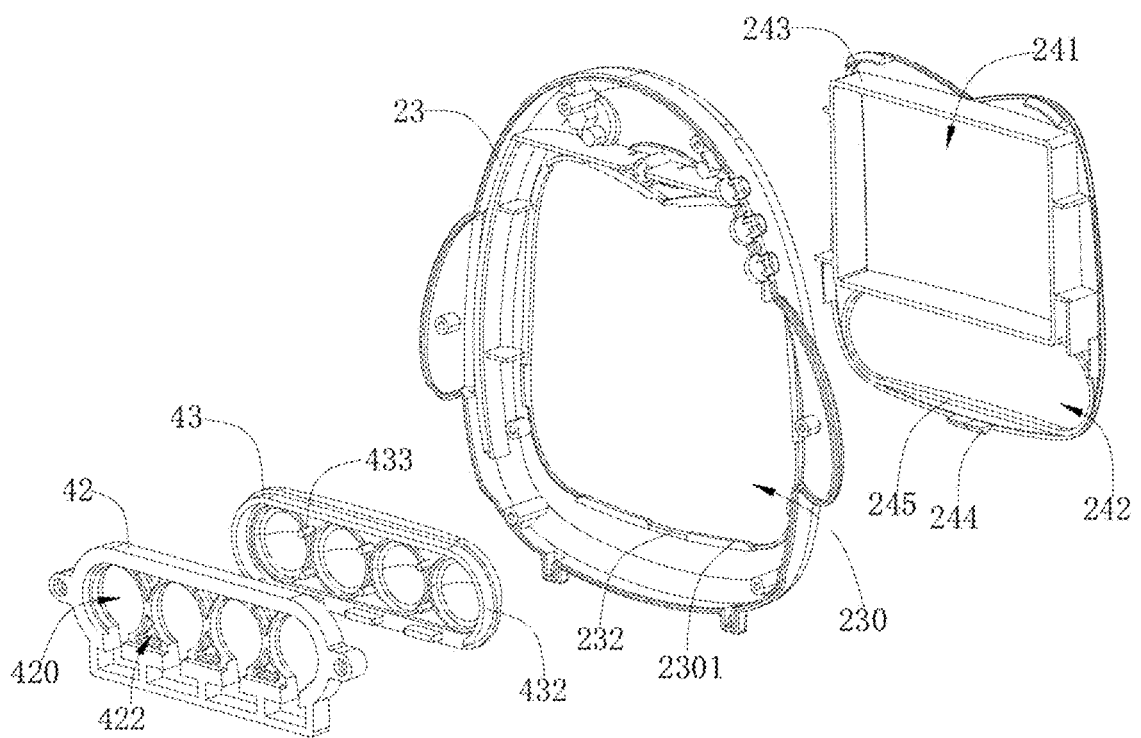

FIG. 15 is an exploded view of a second housing, a third housing and a bubble pressing component thereof according to another embodiment of the present disclosure.

Figure 16:
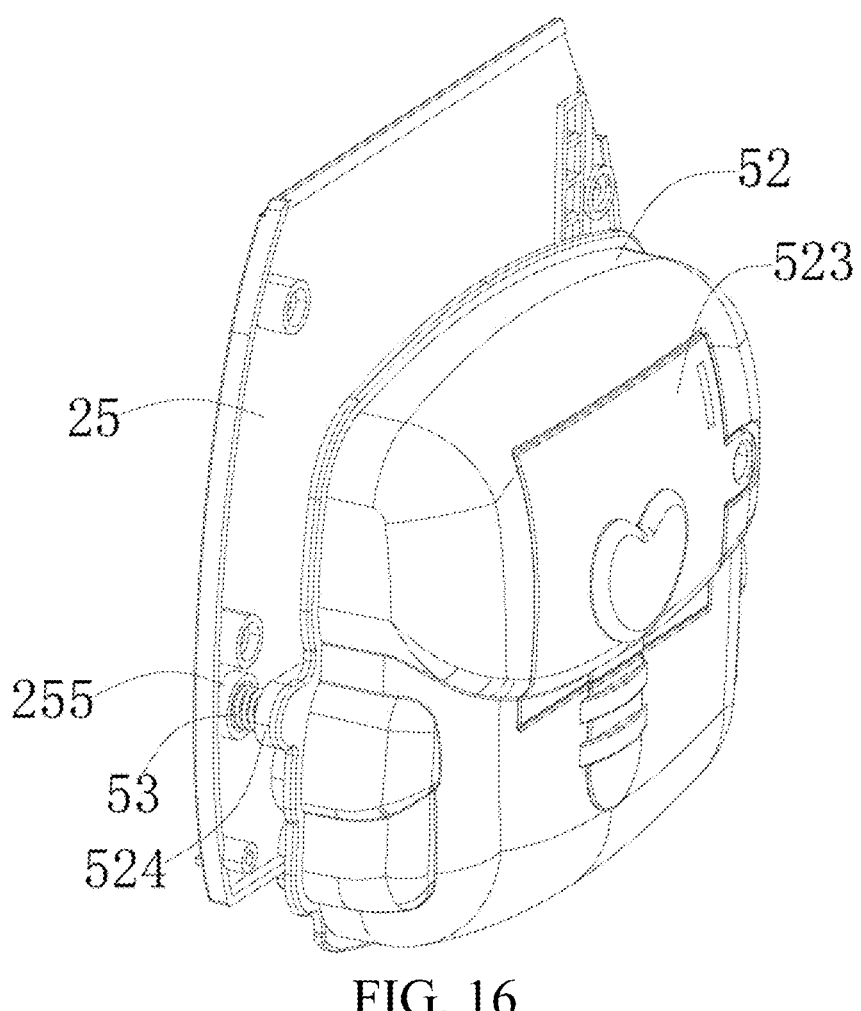

FIG. 16 is a schematic structural view of the structure of a mounting plate, a movable cover and an elastic member according to an embodiment of the present disclosure.

Figure 17:
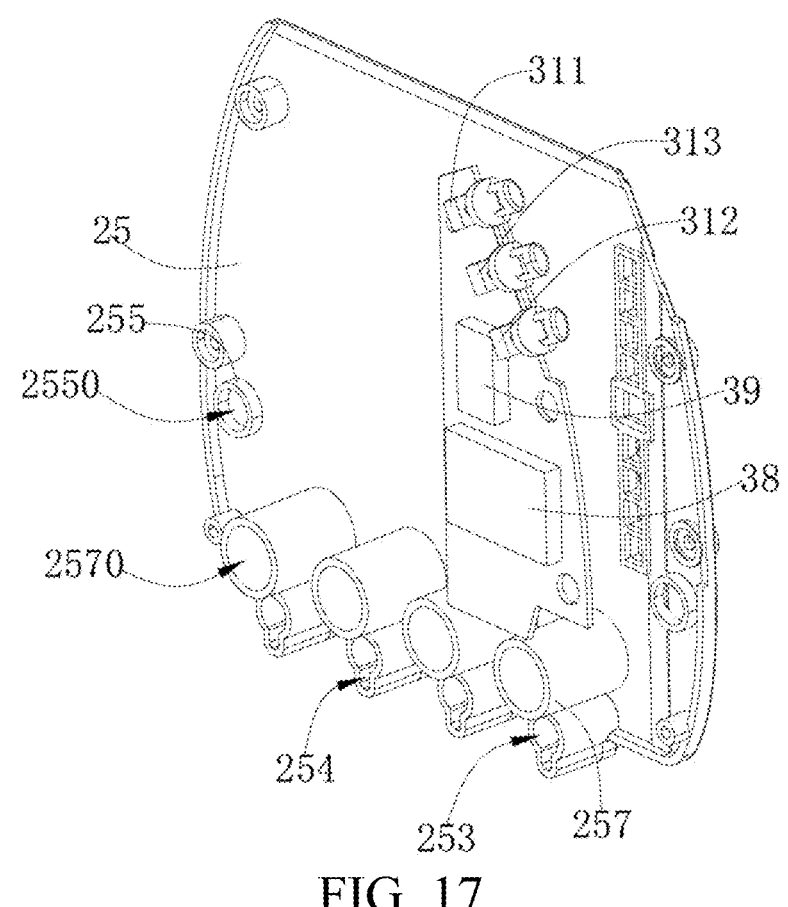

FIG. 17 is a schematic structural view of a mounting plate according to an embodiment of the present disclosure.

Figure 18:
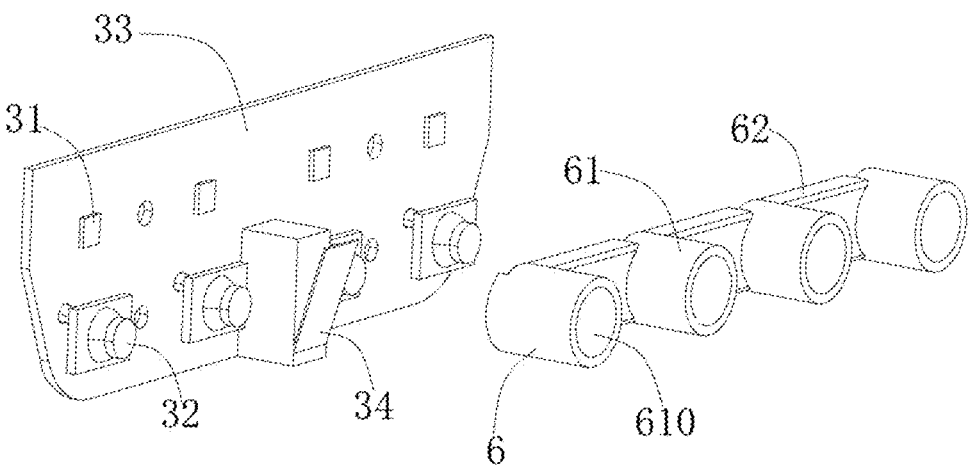

FIG. 18 is a schematic structural view of a light-collecting component, a first circuit board, a light-emitting element, a first switch and a second switch according to an embodiment of the present disclosure.

DETAILED WAY

The present disclosure will be described in detail below with reference to the accompanying drawings and in conjunction with various embodiments. Each example is provided to explain but not limit the present disclosure. In fact, it will be clear to those of ordinary skill that modifications and variations may be made without departing from the scope or spirit of the present disclosure. For example, a feature shown or described as part of one embodiment may be used according to another embodiment to produce yet another embodiment. Therefore, it is intended that the present disclosure includes such modifications and variations within the scope of the appended claims and their equivalents.

In the description of the present disclosure, the terms "longitudinal", "lateral", "upper", "lower", "front", "back", "left", "right", "vertical", "horizontal", "top", "bottom" and the like indicate the orientational or positional relationship based on the orientational or positional relationship illustrated in the drawings, which is only for the convenience of describing and does not require the present disclosure to be constructed and operated in a specific orientation, and therefore cannot be understood as limiting the present disclosure. The terms "connected", "connecting" and "arranged" used in the present disclosure should be understood in a broad sense. For example, it may be a fixed connection or a detachable connection; it may be directly connected or indirectly connected through an intermediate component; it may also be a wired electrical connection, a radio connection, or a wireless signal connection. For those of ordinary skill in the art, the specific meanings of the above terms may be understood according to the specific circumstances.

One or more examples of the present disclosure are illustrated in the attached drawings. Numbers and letter signs are used in the detailed description to refer to features in the drawings. Similar signs in the drawings and descriptions have been configured to refer to similar parts of the present disclosure. As used herein, the terms "first", "second" and "third" are used interchangeably to distinguish one component from another and are not intended to indicate the position or importance of individual components.

As illustrated in FIG. 1 to FIG. 4 and FIG. 12, the embodiment relates to a card learning machine, which is mainly configured for children' learning by inserting cards into the card learning machine. The card learning machine includes a card 1, a housing 2, a circuit control component 3 and an Interactive component 4. The card 1 includes a light-transmitting plate 11 and an identification part 12 arranged on the light-transmitting plate 11. The identification part 12 can block the light penetrating the light-transmitting plate 11, so as to form an identification projection configured for learning on the Interactive component 4.

Specifically, the housing 2 is defined with a card slot 20, and a notch of the card slot 20 penetrate a side wall of the housing 2 for the card 1 to be inserted. The circuit control component 3 is arranged in the housing 2 and connected to an inner wall of the housing 2. The circuit control component 3 is provided with a light-emitting element 31 and a first switch 32. The Interactive component 4 is arranged in the housing 2 and connected to the housing 2. The Interactive component 4 includes a light-transmitting button 41, one end of which is exposed from the housing 2 for the user to press thus realizing the interaction between the user and the card learning machine; another end of which is connected to the first switch 32 to trigger the first switch 32 when it is pressed.

It should be noted that the Interactive component 4 is configured for the user to press, such that the user and the card learning machine are interacted, thereby improving the fun in the learning process, enhancing the attractiveness of the card learning machine and improving the learning effect.

It should also be noted that when inserting the card 1 into the card slot 20, the identification part 12 is located between the light-emitting element 31 and the light-transmitting button 41, and the light generated by the light-emitting element 31 can pass through the light-transmitting plate 11 and the light-transmitting button 41 in sequence. When the light passes through the light-transmitting plate 11, due to the shielding effect of the identification part 12, the identification part 12 forms an identification projection on the light-transmitting button 41 that can be configured for learning. The identification projection configured for learning includes at least one of graphic projection, text projection, digital projection, letter projection, etc.

Figure 1:
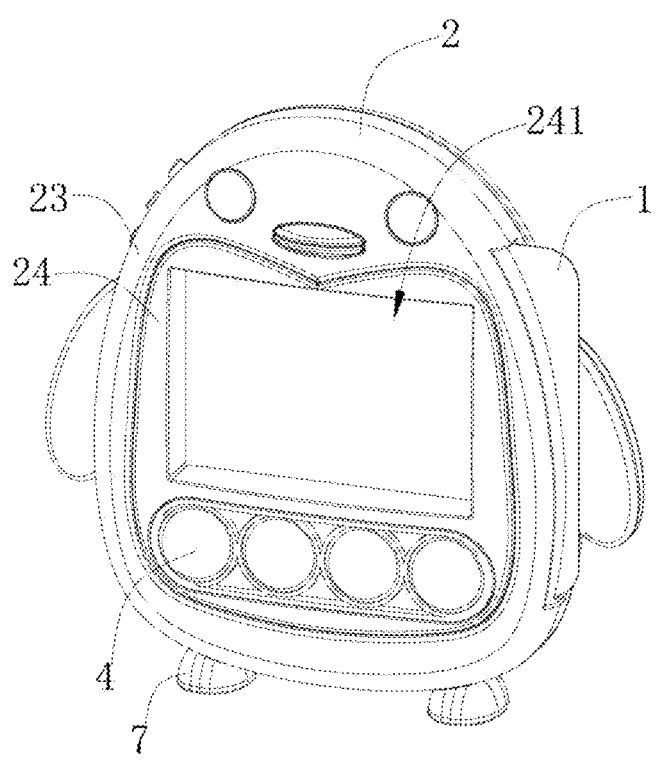
FIG. 1 is a schematic structural view of a card learning machine according to an embodiment of the present disclosure.
Figure 2:
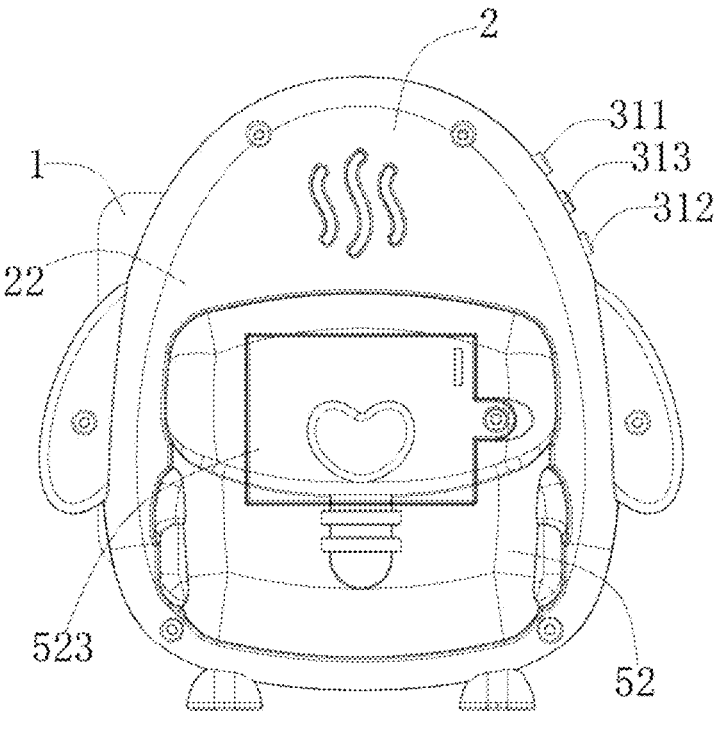
FIG. 2 is a schematic structural view of a card learning machine according to another embodiment of the present disclosure.
Figure 3:
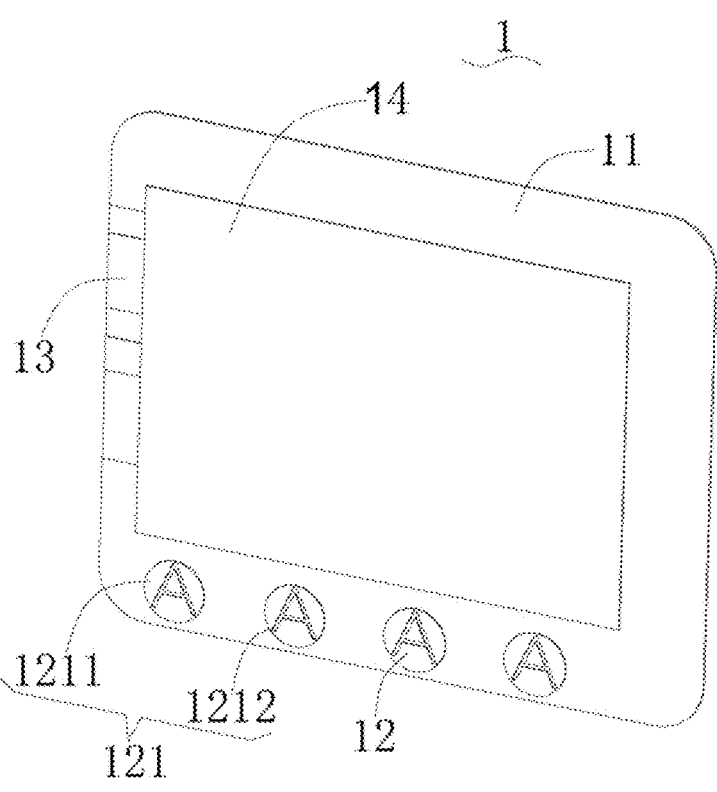
FIG. 3 is a schematic structural view of a card according to an embodiment of the present disclosure.
Figure 4:
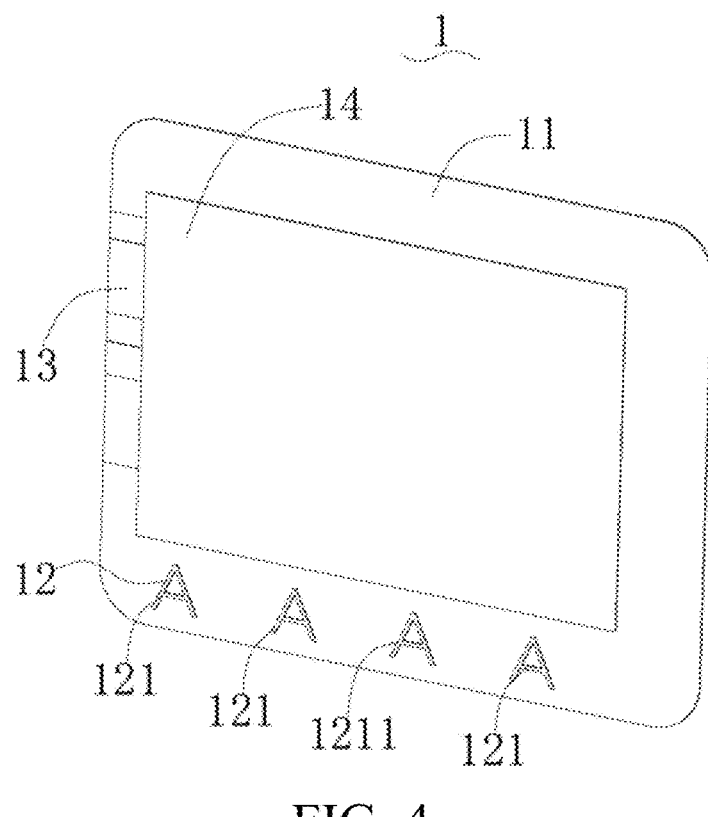
FIG. 4 is a schematic structural view of a card according to another embodiment of the present disclosure.

As illustrated in FIG. 3, FIG. 4 and FIG. 12, in one embodiment, the identification part 12 includes multiple light-shielding layers 121 arranged on a surface of the light-transmitting plate 11, and the multiple light-shielding layers 121 are arranged along a straight line at equal intervals. Each light-shielding layer 121 includes a light-shielding portion 1211 and a light-transmitting portion 1212.

As illustrated in FIG. 3, in one embodiment, the light-shielding layer 121 is circular, the light-transmitting portion 1212 is an identification pattern, and the rest is the light-shielding portion 1211. The light generated by the light-emitting element 31 passes through the light-transmitting plate 11 and the light-transmitting portion 1212 and irradiates the light on the light-transmitting button 41, thereby forming an identification projection on the light-transmitting button 41 with the same shape as the identification pattern. In this case, the identification projection on the light-transmitting button 41 is bright, and the rest of the light-transmitting button 41 is dark.

According to another embodiment, the light-shielding portion 1211 is an identification pattern, and the rest is the light-transmitting portion 1212. The light generated by the light-emitting element 31 passes through the light-transmitting plate 11 and irradiates the light-shielding layer 121. Some of the light is blocked by the light-shielding portion 1211, and the rest of the light passes through the light-transmitting portion 1212 and irradiates the light-transmitting button 41, thereby forming an identification projection with the same shape as that on the light-transmitting button 41. In this case, the identification projection on the light-transmitting button 41 is dark, and the rest of the light-transmitting button 41 is bright.

As illustrated in FIG. 4, in one embodiment, the light-shielding layer 121 is only provided with a light-shielding portion 1211, and the light-shielding portion 1211 is an identification pattern. After passing through the light-transmitting plate 11, the light is irradiated on the light-shielding portion 1211 and blocked by the light-shielding portion 1211, thereby forming an identification projection with the same shape as that on the light-transmitting button 41. In this case, the identification projection on the light-transmitting button 41 is dark, and the rest of the light-transmitting button 41 is bright.

According to another embodiment, the light-shielding layer 121 is only provided with a light-shielding portion 1211, and a hollow portion in the form of an identification is provided in the middle of the light-shielding portion 1211. After passing through the light-transmitting plate 11, the light is irradiated on the light-shielding portion 1211, and some of the light is irradiated on the light-transmitting button 41 through the hollow portion, thereby forming an identification projection with the same shape as that on the light-transmitting button 41. In this case, the identification projection portion on the light-transmitting button 41 is bright, and the rest of the light-transmitting button 41 is dark.

Please continue to refer to FIG. 3, FIG. 4 and FIG. 12, in the present embodiment, the identification pattern is a letter, so the identification projection projected on the light-transmitting button 41 is a letter. There are four light-transmitting buttons 41, four light-emitting elements 31, and four light-shielding layers 121. The light-transmitting buttons 41, the light-emitting elements 31 and the light-shielding layer 121 are arranged correspondingly one by one. In this way, four letter projections are formed on the four light-transmitting buttons 41, which form an English word.

It should be noted that the four light-shielding layers 121 are all arranged at positions corresponding to those of the light-transmitting buttons 41 on the card 1, such that the light generated by the light-emitting elements 31 can be smoothly projected on the light-transmitting buttons 41. In other embodiments, the number of light-emitting elements 31, light-transmitting buttons 41 and light-shielding layers 121 can be arranged as needed, such as three, five, seven, etc., as long as it satisfies that the letter projection formed on the light-transmitting buttons 41 can form an English word.

In one embodiment, the card 1 is also provided with an information identification part 13 and a display part 14. When the card 1 is inserted into the card slot 20, the circuit control component 3 can identify the information identification part 13. The housing 2 is provided with a window that can directly view the display part 14.

In the present embodiment, the four-letter projections form an English word that can express the content of the display part 14. The identification part 12, the information identification part 13 and the display part 14 are all coatings coated on the light-transmitting plate 11. In other embodiments, the identification part 12, the information identification part 13 and the display part 14 are patches, which are connected to the light-transmitting plate 11 by means of attaching or bonding.

Figure 5:
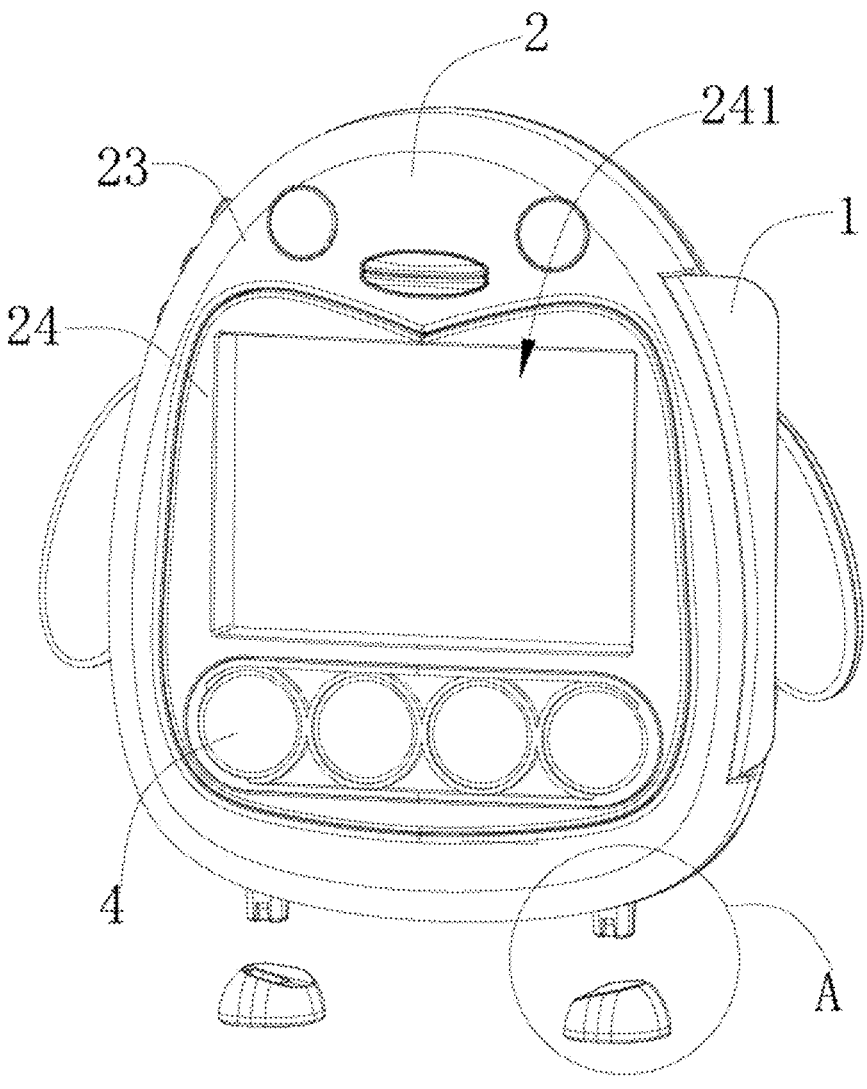
FIG. 5 is an exploded view of a card learning machine according to an embodiment of the present disclosure.
Figure 6:
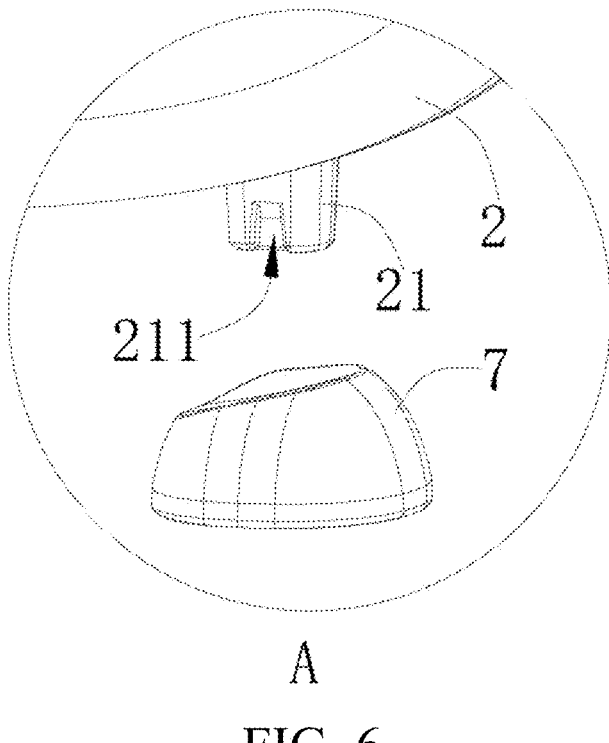
FIG. 6 is an enlarged view of detail A of FIG. 5.

As illustrated in FIG. 5 to FIG. 7, in the present embodiment, the overall shape of the housing 2 is a penguin. A lower end of the housing 2 is provided with a support foot 7, which is plugged in the housing 2. Specifically, a support post 21 protrudes from an outer wall of the housing 2, and the support post 21 is defined with a limiting groove 211. The support foot 7 is defined with a snap-in slot 71, and an inner wall of the snap-in slot 71 is arranged with a limiting column 711. The support post 21 is inserted into the snap-in slot 71, and the limiting column 711 is matched with the limiting groove 211 to achieve a fixed component between the housing 2 and the support foot 7. In other embodiments, the overall shape of the housing 2 can also be other animals, such as cats, dogs, fish, etc. The support foot 7 can be integrally formed with the housing 2.

As illustrated in FIG. 8 to FIG. 13, in an embodiment, the housing 2 includes a first housing 22, a second housing 23, a third housing 24 and a mounting plate 25. The first housing 22 is fixedly connected to the mounting plate 25 by a fastening screw, and the first housing 22 is defined with a first assembly port 220. The second housing 23 is fixedly connected to the first housing 22 by a fastening screw. The Interactive component 4 is fixedly installed on an inner wall of the second housing 23. The second housing 23 is defined with a second assembly port 230, and the third housing 24 is provided in the second assembly port 230 and is detachably connected to the second housing 23. The third housing 24 is provided with a viewing window 241 and a pressing window 242. The viewing window 241 is in communication with the card slot 20, and the user can view the content of the display part 14 through the viewing window 241. A part of the Interactive component 4 is installed in the pressing window 242, and another part is exposed from the third housing 24, such that the user can perform a pressing operation to form an interaction with the card leaning machine.

In one embodiment, the mounting plate 25 is arranged between the light-transmitting button 41 and the light-emitting element 31, the mounting plate 25 is defined with a light-transmitting hole 251, and the light-transmitting hole 251 is arranged corresponding to the light-emitting element 31, such that the light generated by the light-emitting element 31 can pass through the mounting plate 25 and shine on the light-transmitting plate 11. It should be noted that the mounting plate 25 and the second housing 23 are surrounded to form the card slot 20, and an opening of the card slot 20 penetrates a side wall of the second housing 23.

As illustrated in FIG. 10 and FIG. 11, in the present embodiment, the first housing 22 is arranged with a mounting post 221, and a side of the mounting post 221 close to the second housing 23a is defined with a pre-installing groove 222. A threaded column 231 is arranged on a side of the second housing 23 close to the first housing 22. When assembling the first housing 22 and the second housing 23, the threaded column 231 is inserted into the pre-installing groove 222 to position the mounting post 221 and the threaded column 231, and then a fastening screw is inserted into the mounting post 221 and to be threadedly engaged with the threaded column 231. Thus, the first housing 22 and the second housing 23 is fixed. In other embodiments, the first housing 22 and the second housing 23 can also be fixed and assembled by means of snap-in connection, bonding, etc., as long as it meets the requirement of fixing and assembling the first housing 22 and the second housing 23.

As illustrated in FIG. 10 to FIG. 12, in one embodiment, the viewing window 241 is rectangular, and four sides extend toward the mounting plate 25 to form an extension portion 243. There is a gap between the extension portion 243 and the mounting plate 25, and the size of the gap is greater than the thickness of the card 1. After the card 1 is inserted into the card slot 20, the position of the card 1 is limited by the extension portion 243 to prevent the card 1 from shaking in the card slot 20, thereby improving user experience of the card learning machine. For example, it is conducive to viewing the display part 14 during use and improving the learning effect.

In one embodiment, the third housing 24 can be integrally formed with the second housing 23.

Please continue to refer to FIG. 10 to FIG. 12, in one embodiment, a clamping portion 232 is provided on an inner wall of the second housing 23, and the clamping portion 232 is located at an edge of the second assembly port 230. A clamping joint 244 adapted to the clamping portion 232 is provided on the third housing 24.

In other embodiments, a plurality of clamping joints 244 are provided, and a plurality of clamping portions 232 correspondingly to the plurality of clamping joints 244 are also provided. The clamping joints 244 are all provided on the second housing 23, and the clamping portions 232 are all provided on the third housing 24. Alternatively, some of the clamping joints 244 and some the clamping portions 232 are provided on the second housing 23, and the remaining of the clamping joints 244 and the clamping portions 232 are provided on the third housing 24. The arrangement of the clamping joints 244 and the clamping portions 232 only need to meet the requirements of being able to engage with each other to fix the third housing 24 to the second assembly port 230 of the second housing 23.

In one embodiment, a limiting strip 2301 protrudes from a side wall of the second assembly port 230. When the third housing 24 is installed in the second assembly port 230, the limiting strip 2301 is configured to carry the third housing 24 and limit the movement of the third housing 24. The arrangement of the limiting strip 2301 can prevent the third housing 24 from falling into an inner cavity of the housing 2 from the second assembly port 230 and facilitate the clamping joint 244 and the Clamping portion 232 to be engaged more tightly.

As illustrated in FIG. 12 to FIG. 15, in one embodiment, the Interactive component 4 also includes a fixing frame 42 and a pressing plate 43. The fixing frame 42 is arranged in the housing 2 and is fixedly connected to an inner wall of the second housing 23 by a fastening screw. The fixing frame 42 is provided with an avoidance opening 420, which is arranged corresponding to the light-emitting element 31 and the light-transmitting hole 251, such that the light generated by the light-emitting element 31 can pass through the mounting plate 25 and the fixing frame 42 to irradiate the light-transmitting button 41. The pressing plate 43 is arranged between the fixing frame 42 and the second housing 23 and is pressed and fixed on the inner wall of the housing 2 by the fixing frame 42. The light-transmitting button 41 is arranged on the pressing plate 43 and is arranged corresponding to the avoidance opening 420.

In one embodiment, one side of the fixing frame 42 close to the pressing plate 43 is provided with a plug-in slot 421. The pressing plate 43 includes a plate body 431 and a plug-in portion 432. Specifically, the plate body 431 is pressed and fixed on the second housing 23 by the fixing frame 42. The plug-in portion 432 is protruded from one side of the plate body 431 close to the fixing frame 42, and the plug-in portion 432 is inserted into the plug-in slot 421, which can not only increase the tightness of the component of the pressing plate 43 and the fixing frame 42, but also fix the pressing plate 43 and the fixing frame 42 in advance during installation. Therefore, the installation of the pressing plate 43 is facilitated.

In one embodiment, a positioning strip 245 is provided on an inner wall of the third housing 24, and the positioning strip 245 is located at an edge of the pressing window 242. The plate body 431 is defined with a positioning groove 430 adapted to the positioning strip 245. Through the engagement of the positioning strip 245 and the positioning groove 430, the tightness of the assembly between the pressing plate 43 and the third housing 24 can be further improved.

In one embodiment, the fixing frame 42 is defined with a plug-in hole 422. A plug-in post 434 is protruded at a position corresponding to the plug-in hole 422 on an end surface of the pressing plate 43 close to the fixing frame 42. When the fixing frame 42 presses the pressing plate 43 against the third housing 24, the plug-in post 434 is inserted into the plug-in hole 422.

In one embodiment, the light-transmitting button 41 is a bubble-shaped button which can be pressed by a finger. The bubble-shaped button has a raised state and a recessed state. Under the action of force, the bubble-shaped button can repeatedly switch between the raised state and the recessed state. When the bubble-shaped button is in the raised state, its raised part is exposed from the housing 2; when the bubble-shaped button is in the recessed state, its recessed part is accommodated in the avoidance opening 420. The arrangement of the avoidance opening 420 can not only facilitate the light passing through the light-transmitting plate 11 to form an identification projection on the bubble-shaped button, but also provide space for the deformation of the bubble-shaped button.

In one embodiment, the card learning machine further includes a reset component 5, which is disposed in the housing 2 and connected to the housing 2. One end of the reset component 5 abuts against the bubble-shaped button, and another end is exposed from the housing 2. The reset component 5 can move relative to the housing 2 to switch the bubble-shaped button from the recessed state to the raised state.

In the present embodiment, the bubble-shaped button and the pressing plate 43 are integrally formed. The bubble-shaped button is hemispherical and is accommodated in the pressing window 242. The bubble-shaped button can be deformed. Before being pressed, the bubble-shaped button is a spherical protrusion and protrudes out of the outer wall of the housing 2; after being pressed, the bubble-shaped button is a spherical groove and can be pressed by the reset component 4 to switch from the recessed state to the raised state. Therefore, the pressing operation can be performed again.

As illustrated in FIG. 12, FIG. 13, FIG. 16 and FIG. 17, in one embodiment, the reset component 5 includes a push rod 51, a movable cover 52 and an elastic member 53. The push rod 51 includes a first part 511 and a second part 512, and the second part 512 is connected to the first part 511. The first part 511 is movably placed in the avoidance opening 420. An end of the second part 512 away from the first part 511 penetrates the mounting plate 25 and extends away from the mounting plate 25. The push rod 51 can move relative to the mounting plate 25 to be away from or close to the pressing plate 43. The movable cover 52 is connected to the mounting plate 25. The movable cover 52 can move relative to the housing 2, thereby driving the push rod 51 to move toward the pressing plate 43 to reset the bubble-shaped button. One end of the elastic member 53 is connected to the movable cover 52, and another end is connected to the mounting plate 25. The elastic member 53 provides a driving force for resetting the movable cover 52.

In one embodiment, a stop bar 252 is protruded from one side of the mounting plate 25 close to the fixing frame 42. The first part 511 is arranged between the stop bar 252 and the pressing plate 43. When the card 1 is inserted into the card slot 20, the card 1 is carried on the stop bar 252.

It should be noted that the stop bar 252 is arranged below the light-transmitting hole 251 such that the identification part 12 is located between the light-transmitting hole 251 and the avoidance opening 420 after the card 1 is inserted into the card slot 20. When being pressed, the bubble-shaped button is deformed and switched from the raised state to the recessed state, and the recessed part is accommodated in the avoidance opening 420. Meanwhile, the bubble-shaped button squeezes the first part 511 in the process of switching from the raised state to the recessed state, such that the first part 511 moves toward the stop bar 252. When the first part 511 abuts against the stop bar 252, the first part 511 stops moving, such that there is always a gap between the first part 511 and the stop bar 252, then the card 1 can be inserted into the card slot 20.

It should also be noted that the bubble-shaped button is indirectly connected to the first switch 32 through the push rod 51. When the first part 511 moves toward one side of the stop bar 252, the second part 512 is driven to move toward one side of the first switch 32, such that the second part 512 presses the first switch 32, thereby triggering the first switch 32, allowing the circuit control component 3 to control the light-emitting element 31 to turn off.

Please continue to refer to FIG. 12, FIG. 13, FIG. 16 to FIG. 17, in one embodiment, the mounting plate 25 is provided with a through hole 253. The second part 512 passes through the through hole 253 and can move relative to the through hole 253 along an axial direction of the through hole 253. The first part 511 is configured as an annular structure such that the recessed part of the bubble-shaped button in the recessed state can be accommodated in the annular ring surrounded by the annular structure. The second part 512 is configured as a rod-shaped structure and is integrally formed with the first part 511.

When the second part 512 is driven by the movable cover 52 to move toward one side of the pressing plate 43, the first part 511 is driven to move synchronously. During the movement of the first part 511, the first part 511 abuts against the bubble-shaped button and can pass through the avoidance opening 420 until the bubble-shaped button is reset.

In one embodiment, the mounting plate 25 is provided with a guide hole 254, and the guide hole 254 penetrates the mounting plate 25 in the thickness direction and is in communication with the through hole 253. The push rod 51 also includes a guide portion 513, and the guide portion 513 is integrally formed with the second part 512. The guide portion 513 engages with the guide hole 254 to prevent the push rod 51 and the mounting plate 25 from rotating and guides the push rod 51 to move along with the first part 511, such that the first part 511 always remains aligned with the avoidance opening 420, which is conducive to the resetting of the reset component 5.

In the present embodiment, four push rods 51 are provided, and four through holes 253 and guide holes 254 are provided. The first part 511 is provided corresponding to the avoidance opening 420, and the second part 512 is provided in the combined hole formed by the through hole 253 and the guide hole 254. A guide portion 513 is provided correspondingly on each second part 512, and the guide portion 513 is plate-shaped.

In one embodiment, the movable cover 52 is disposed in the first assembly port 220, and can move relative to the first housing 22, so as to be away from or close to the mounting plate 25. An anti-detachment part 521 is protruded on an outer wall of the movable cover 52 close to the mounting plate 25, and the anti-detachment part 521 abuts against an inner wall of the first housing 22, which can prevent the movable cover 52 from slipping out of the first assembly port 220.

In one embodiment, one side of the movable cover 52 away from the mounting plate 25 is provided with a battery compartment 522 and a compartment cover 523. The compartment cover 523 is detachably assembled with the movable cover 52 so that the battery compartment 522 can be opened or closed. In the present embodiment, a metal conductive sheet is provided on a side wall of the battery compartment 522, and the metal conductive sheet is connected to the circuit control component 3 through a wire to supply power to the circuit control component 3.

In one embodiment, a mounting ear 524 connected to the anti-detachment part 521 is provided on the movable cover 52, and the mounting ear 524 is defined with a first mounting groove 525, and a connecting post 526 is protruded from a bottom of the first mounting groove 525. A mounting post 255 is provided on the mounting plate 25 at a position corresponding to the first mounting groove 525, and the mounting post 255 is defined with a second mounting groove 2550. One end of the elastic member 53 is accommodated in the first mounting groove 525 and is sleeved on the connecting post 526, and another end of the elastic member 53 is installed in the second mounting groove 2550.

In the present embodiment, two mounting ears 524, two first mounting grooves 525, two connecting posts 526, and two mounting posts 255 are provided. There are also two elastic members 53, both of which are springs. In other embodiments, the elastic member 53 can also be a spring sheet, a spring block, etc.

As illustrated in FIG. 12, FIG. 13 and FIG. 17, in one embodiment, the circuit control component 3 includes a first circuit board 33. The first circuit board 33 is fixedly mounted on an inner wall of the movable cover 52 and can move synchronously with the movable cover 52. The light-emitting element 31 is arranged on one side of the first circuit board 33 close to the mounting plate 25 and is electrically connected to the first circuit board 33. The first switch 32 is fixedly mounted on the first circuit board 33 and is electrically connected to the first circuit board 33. The first switch 32 and the light-emitting element 31 are arranged on a same side, and the first switch 32 is arranged corresponding to the second part 512, such that the second part 512 triggers the first switch 32 when the bubble-shaped button is pressed.

The circuit control component 3 also includes a second switch 34 fixedly mounted on the first circuit board 33, and the second switch 34 is electrically connected to the first circuit board 33. The second switch 34 is disposed on a same side as the first switch 32, and a trigger post 256 is protruded on the mounting plate 25 at a position corresponding to the second switch 34.

When being pressed, the bubble-shaped button is deformed and squeezes the first part 511, such that the first part 511 drives the second part 512 to move toward one side of the movable cover 52, and the second part 512 abuts against the first switch 32. Thus, the first switch 32 is triggered. When the movable cover 52 is pressed to reset the bubble-shaped button, the elastic member 53 is elastically deformed and its length is compressed, and the movable cover 52 and the first circuit board 33 move synchronously toward the mounting plate 25, such that the first switch 32 installed on the first circuit board 33 pushes the second part 512 toward the pressing plate 43 and drives the first part 511 to move away from the mounting plate 25. Through the push of the first part 511, the bubble-shaped button is driven to switch from the recessed state to the raised state (i.e. reset), then the interactive pressing operation can be performed again. Meanwhile, the second switch 34 installed on the first circuit board 33 abuts against the trigger post 256, such that the trigger post 256 triggers the second switch 34.

In one embodiment, a light-guiding tube 257 is provided on the mounting plate 25 at a position corresponding to the light-transmitting hole 251, and the light-guiding tube 257 is defined with a light-transmitting channel 2570 in communication with the light-transmitting hole 251. The card learning machine also includes a light-collecting component 6. One end of the light-collecting component 6 is connected to the first circuit board 33, and another end of the light-collecting component 6 is movably sleeved in the light-transmitting channel 2570.

As illustrated in FIG. 3, FIG. 12, FIG. 13, FIG. 17 and FIG. 18, in one embodiment, the light-collecting component 6 includes a light-collecting tube 61 and a connecting plate 62. Specifically, the light-collecting tube 61 is covered on the light-emitting element 31 to gather the light generated when the light-emitting element 31 is turned on, to enhance the light intensity and the projection effect of the identification part 12 on the bubble-shaped button. One end of the light-collecting tube 61 abuts against the first circuit board 33, and another end extends into the light-transmitting channel 2570. The light-collecting tube 61 and the light-guiding tube 257 are movably sleeved together, and the light-collecting tube 61 has an axially arranged light-guiding channel 610 to guide the light into the light-transmitting channel 2570. A portion of the connecting plate 62 is connected to the light-collecting tube 61, and another portion is fixedly mounted on the first circuit board 33 by a fastening screw.

In one embodiment, four light-collecting tubes 61 are provided corresponding to the number of light-transmitting holes 251. The connecting plate 62 is provided between adjacent light-collecting tubes 61, and two ends of the connecting plate 62 are respectively connected to different light-collecting tubes 61. In the present embodiment, the light-collecting tubes 61 and the connecting plates 62 are integrally formed.

In one embodiment, one side of the light-collecting tube 61 close to the first circuit board 33 is defined with a heat dissipation groove 611, and the heat dissipation groove 611 is in communication with the light-guiding channel 610 of the light-collecting tube 61, such that the light emitting element 31 can dissipate heat.

Please continue to refer to FIG. 12, FIG. 13, FIG. 17 and FIG. 18, in one embodiment, the mounting plate 25 is defined with a plurality of avoidance holes 258, and the circuit control component 3 further includes a second circuit board 35, a detection switch 36, a sensor 37, a control chip 38, a storage chip 39, a speaker 310, a start switch 311, a toggle switch 312 and a volume adjustment switch 313.

Specifically, the second circuit board 35 is pressed and fixed on the first housing 22 by the mounting plate 25. The second circuit board 35 is electrically connected to the first circuit board 33 through a wire. One end of the detection switch 36 is fixedly mounted on the second circuit board 35 and electrically connected to the second circuit board 35, and another end is accommodated in one of the avoidance holes 258. A plurality of sensors 37 are provided, and one end of each sensor 37 is fixedly mounted on the second circuit board 35 and electrically connected to the second circuit board 35, and another end is accommodated in each of the remaining avoidance holes 258. The control chip 38 is fixedly connected to the second circuit board 35 and electrically connected to the second circuit board 35. The storage chip 39 is fixedly connected to the second circuit board 35 and is electrically connected to the second circuit board 35. The speaker 310 is fixedly connected to the second circuit board 35 and is electrically connected to the second circuit board 35. The start switch 311 is fixedly mounted on a side wall of the second circuit board 35 and is electrically connected to the second circuit board 35. The toggle switch 312 is fixedly mounted on a side wall of the second circuit board 35 and is electrically connected to the second circuit board 35. The volume adjustment switch 313 is fixedly mounted on a side wall of the second circuit board 35 and is electrically connected to the second circuit board 35.

When the card 1 is inserted into the card slot 20, the card 1 presses against and triggers the detection switch 36, such that the control chip 38 controls all the light-emitting elements 31 to turn on. Meanwhile, the sensor identifies the information identification part 13 and sends a first electrical signal generated thereafter to the control chip 38, such that the control chip 38 matches a first voice information corresponding to the information identification part 13 from the first voice information stored in the storage chip 39 and sends the matched first voice information to the speaker 310 in the form of an electrical signal. Then the speaker 310 broadcasts the first voice information. In this state, when being pressed, the bubble-shaped button is deformed and switched from a raised state to a recessed state, drives the push rod 51 to move toward the first switch 32, and triggers the first switch 32. Therefore, the control chip 38 controls the light-emitting element 31 corresponding to the first switch 32 to turn off, matches the first voice information corresponding to the triggering of the first switch 32 from the first voice information stored in the storage chip 39, and sends the matched first voice information to the speaker 310 in the form of an electrical signal. Then, the speaker 310 broadcasts the first voice information. After that, when being pressed, the movable cover 52 drives the first circuit board 33 to move synchronously toward the mounting plate 25 and drives the push rod 51 to move toward the bubble-shaped button through the first switch 32, such that the bubble-shaped button is reset. In this process, the second switch 34 is synchronously approaching the trigger post 256 and is triggered by the trigger post 256, such that the control chip 38 matches the second voice information corresponding to the triggering of the second switch 34 from the second voice information stored in the storage chip 39, and sends the matched second voice information to the speaker 310 in the form of a second electrical signal. Then, the speaker 310 broadcasts the second voice information.

It should be noted that after the first switch 32 is triggered, the speaker 310 broadcasts the pronunciation corresponding to the projected letter. After the second switch 34 is triggered, the speaker 310 broadcasts the pronunciation of the English sentence containing the English words composed of the projected letters.

In the present embodiment, the light-emitting element 31 is a SMD LED lamp bead, and its model is 0201 face-mounted LED lamp bead. The first switch 32 is a touch switch, and its model is TS-1187. The first switch 32 is a micro switch, and its model is SM3-01N. The detection switch 36 is a micro switch, and its model is JC-TS10. The sensor 37 is an infrared sensor, and its model is D203S. The control chip 38 is an OTP voice chip, and its model is SZY42FS16. The model of the storage chip 39 is BL24C512A-PARC. The start switch 311, the toggle switch 312 and the volume adjustment switch 313 are all touch switches, and their model is TS-A007. In other embodiments, the model can be selected according to actual needs.

It should be noted that when the card 1 is inserted into the card slot 20, one end of the card 1 abuts against a trigger sheet on the detection switch 36, thereby triggering the detection switch 36. Meanwhile, the information identification part 13 corresponds to the avoidance hole 258, such that the sensor 37 can detect and identify the information identification part 12.

The present embodiment also provides a card learning method, which is based on the above-mentioned card learning machine and specifically includes the following operations.

Operation S1: opening a compartment cover 523, installing a battery into the battery compartment 522, closing the compartment cover 523, starting the card learning machine by turning on a switch 311 to allow the card learning machine to enter a game mode.

Operation S2: inserting a card 1 into a card slot 20 to allow one end of the card 1 to trigger a detection switch 36; generating and transmitting, by the detection switch 36, an electrical signal to the control chip 38; and controlling, by the control chip 38, all the light-emitting elements 31 to turn on.

Operation S3: detecting, by a sensor 37, an information identification part 13, generating, by the sensor 37, a first electrical signal according to an identification result; transmitting back, by the sensor 37, the first electrical signal to the control chip 38; receiving and analyzing, by the control chip 38, the first electrical signal transmitted back by the sensor 37; sending, by the control chip 38, the storage information corresponding to the content of the inserted card 1 stored in the storage chip 39 to the speaker 310 in the form of the first electrical signal according to an analysis result; receiving and analyzing, by a speaker 310, the first electrical signal sent by the control chip 38; and playing, by the speaker 310, the voice.

Operation S4: pressing the bubble-shaped button to change it from a raised state to a recessed state; driving, by the bubble-shaped button, the push rod 51 to move toward a first circuit board 33 and trigger a first switch 32; generating and transmitting, by the first switch 32, an electrical signal to the control chip 38; receiving, by the control chip 38, the electrical signal generated by the first switch 32; extracting and sending, by the control chip 38, the corresponding storage information from the storage chip 39 to the speaker 310 in the form of an electrical signal; receiving and analyzing, by the speaker 310, the electrical signal sent by the control chip 38; and playing, by the speaker, the voice.

Operation S5: pressing a movable cover 52 to allow the movable cover 52 and the first circuit board 33 to move toward the mounting plate 25; driving, by the first switch 32, the push rod 51 to move toward the pressing plate 43 and push the finger-pressed bubble-shaped button to reset; a second switch 34 generating and transmitting, by a trigger post 256, an electrical signal to the control chip 38; receiving, by the control chip 38, the electrical signal generated by the second switch 34; extracting and sending, by the control chip 38, the corresponding storage information from the storage chip 39 to the speaker 310 in the form of an electrical signal; receiving and analyzing, by the speaker 310, the electrical signal sent by the control chip 38; and playing, by the speaker 310, the voice.

Operation S6: taking out the card 1 from the card slot 20; de-triggering the detection switch 36; and controlling, by the control chip 38, all the light-emitting elements 31 to turn off.

Operation S7: replacing another card 1 or another side of the card 1; and repeating operations S2 to S6.

In one embodiment, the card learning method includes the following operations between operation S1 and operation S2.

Operation S11: pressing a toggle switch 312; generating and sending, by the toggle switch 312; an electrical signal to the control chip 38; controlling, by the control chip 38, the card learning machine to enter a test mode; inserting the card 1 into the card slot 20 under the test mode; pressing one end of the card 1 to trigger the detection switch 36; performing, by the card learning machine, the following operations.

Operation S112: generating and transmitting, by the detection switch 36 and the sensor 37, an electrical signal to the control chip 38; receiving, by the control chip 38, the electrical signal generated by the detection switch 36; and extracting and sending, by the control chip 38, the corresponding storage information from the storage chip 39 to the speaker 310 in the form of an electrical signal; receiving and analyzing, by the speaker 310, the electrical signal sent by the control chip 38; and playing, by the speaker 310, the voice.

Operation S113: pressing the bubble-shaped button to change it from a raised state to a recessed state; driving, by the bubble-shaped button, the push rod 51 to move toward the first circuit board 33 to trigger the first switch 32; generating and transmitting, by the first switch 32, a second electrical signal to the control chip 38; receiving, by the control chip 38, the second electrical signal generated by the first switch 3; controlling, by the control chip 38, the light-emitting element 31 corresponding to the pressed bubble-shaped button to turn on; extracting and sending, by the control chip 38, the corresponding storage information from the storage chip 39 to the speaker 310 in the form of the second electrical signal; receiving and analyzing, by the speaker 310, the second electrical signal sent by the control chip 38; and playing, by the speaker 310, the voice.

Operation S114: pressing the movable cover 52 to move the movable cover 52 and the first circuit board 33 toward the mounting plate 25; driving, by the first switch 32, the push rod 51 to move toward the pressing plate 43; and pushing the bubble-shaped button to reset.

Operation S115: de-triggering the detection switch 36 after taking out the card 1 from the card slot 20; and controlling, by the control chip 38, all the light-emitting elements 31 to turn off.

Operation S116: repeating operations S112 to S115 after replacing another card 1 or another side of the card 1.

Compared with the related art, the present disclosure has the following technical effects.

1) Through the Interactive component 4 and the reset component 5, the card learning machine can interact with children, which can not only improve the fun of the learning process, enhance the attractiveness of the card learning machine and improve the learning effect; but also, can also train children's ability of touching and moving, further improving the learning effect.

2) Through the light-collecting component, after the light-emitting element 31 is turned on, the light is gathered to increase the intensity of the light, thereby improving the projection effect of the identification part 12 on the bubble-shaped button.

The above description is only some embodiments of the present disclosure and is not intended to limit the present disclosure. For those of ordinary skill in the art, the present disclosure may have various modifications and variations. Any modification, equivalent replacement, improvement, etc. made within the spirit and principle of the present disclosure shall be included in the protection scope of the present disclosure.

What is claimed is:

1. A card learning machine, comprising:
   a card, comprising a light-transmitting plate and an identification part arranged on the light-transmitting plate, wherein the identification part is capable of blocking a light penetrated from the light-transmitting plate;
   a housing, defined with a card slot, wherein an opening of the card slot penetrates a side wall of the housing for the card to be inserted;
   a circuit control component, arranged in the housing and connected to the housing, wherein the circuit control component is provided with a light-emitting element and a first switch; and
   an interactive component, arranged in the housing and connected to the housing, wherein the interactive component comprises a light-transmitting button; one end of the light-transmitting button is exposed from the housing and another end of the light-transmitting button is connected to the first switch; in response to the interactive component being pressed, the interactive component triggers the first switch;
   wherein the identification part is located between the light-emitting element and the light-transmitting button; in response to the card being inserted into the card slot, the light generated by the light-emitting element is capable of sequentially passing through the light-transmitting plate and the light-transmitting button.

2. The card learning machine according to claim 1, the interactive component comprising:
   a fixing frame, fixedly disposed in the housing and defined with an avoidance opening, wherein the avoidance opening is arranged corresponding to the light-emitting element, such that the light is capable of passing through the fixing frame to irradiate the light-transmitting button; and
   a pressing plate, arranged between the fixing frame and the housing, and fixed to the housing by the fixing frame, wherein the light-transmitting button is arranged on the pressing plate and corresponding to the avoidance opening.

3. The card learning machine according to claim 2, wherein the light-transmitting button is a bubble-shaped button, the bubble-shaped button has a raised state and a recessed state, and a recessed part of the bubble-shaped button is accommodated in the avoidance opening when the bubble-shaped button is in the recessed state;

the card learning machine also comprises a reset compo-
nent arranged in the housing and connected to the
housing, one end of the reset component abuts against
the bubble-shaped button, and another end of the reset
component is exposed from the housing, and the reset
component is capable of moving relative to the housing
to switch the bubble-shaped button from the recessed
state to the raised state.

4. The card learning machine according to claim 3,
wherein a mounting plate is fixedly disposed in the housing,
the mounting plate is defined with a light-transmitting hole
corresponding to the avoidance opening, and the reset com-
ponent comprises:

a push rod having a first part and a second part connected
to the first part, wherein the first part is movably placed
in the avoidance opening, one end of the second part
away from the first part passes through the mounting
plate and extends away from one side of the mounting
plate, and the push rod is capable of moving relative to
the mounting plate to move away from or close to the
pressing plate;

a movable cover connected to the mounting plate,
wherein the movable cover is capable of moving rela-
tive to the housing to drive the push rod to move toward
the pressing plate; and an elastic member, wherein one end of the elastic member
is connected to the movable cover, another end of the
elastic member is connected to the mounting plate, and
the elastic member provides a driving force for reset-
ting the movable cover.

5. The card learning machine according to claim 4,
wherein the mounting plate is defined with a through hole
and a guide hole, the guide hole is in communication with
the through hole, the push rod also comprises a guide
portion, and the guide portion engages with the guide hole
to guide the push rod to move.

6. The card learning machine according to claim 4,
wherein a stop bar is protruded from the mounting plate near
the fixing frame such that there is a gap between the first part
and the stop bar.

7. The card learning machine according to claim 4,
wherein the circuit control component comprises a first
circuit board, the first circuit board is fixedly mounted on an
inner wall of the movable cover and is capable of moving
synchronously with the movable cover, and the light-emit-
ting element and the first switch are both arranged on one
side of the first circuit board close to the mounting plate and
electrically connected to the first circuit board; and in response to the movable cover being pressed, the elastic
member undergoes elastic deformation with a com-
pressed length and the movable cover and the first
circuit board move synchronously toward one side of
the mounting plate to drive the first switch to push the
push rod toward one side of the pressing plate to reset
the bubble-shaped button.

8. The card learning machine according to claim 7,
wherein the circuit control component also comprises a
second switch fixedly mounted on the first circuit board, the
second switch is electrically connected to the first circuit
board and is arranged on a same side as the first switch, a
trigger post is protruded from a position corresponding to
the second switch on the mounting plate, and the second
switch abuts against the trigger post and triggers the second
switch in response to the push rod driving the bubble-shaped
button to reset.

9. The card learning machine according to claim 7,
wherein an information identification part is arranged on the
light-transmitting plate, and the circuit control component
also comprises:

a second circuit board fixed on an inner wall of the
housing by the mounting plate, wherein the first circuit
board is electrically connected to the second circuit
board; the second circuit board is provided with a
sensor, a detection switch, a control chip and a storage
chip; the storage chip is configured to store voice
information; the sensor, the detection switch, the con-
trol chip and the storage chip are electrically connected
through the second circuit board; and a speaker, fixedly mounted on the inner wall of the
housing and electrically connected to the first circuit
board or the second circuit board;

wherein, in response to the card being inserted into the
card slot, the card abuts and triggers the detection
switch to allow the control chip to control the light-
emitting element to turn on, the sensor identifies the
information identification part, and sends a first elec-
trical signal generated by the information identification
part to the control chip, the control chip matches a first
voice information corresponding to the information
identification part stored in the storage chip and sends
the matched first voice information to the speaker, and
the speaker broadcasts the first voice information; and in response to the first switch being triggered by pressing
the light-transmitting button, the first switch generates
and sends a second electrical signal to the control chip,
the control chip controls the light-emitting element
corresponding to the light-transmitting button to turn
off and sends a second voice information corresponding
to the light-emitting element stored in the storage chip
to the speaker, and the speaker broadcasts the second
voice information.

10. The card learning machine according to claim 7,
wherein a light-guiding tube is provided on the mounting
plate at a position corresponding to the light-transmitting
hole, and the light-guiding tube is defined with a light-
transmitting channel in communication with the light-trans-
mitting hole; the interactive component also comprises a
light-collecting component, one end of the light-collecting
component is connected to the first circuit board, and
another end of the light-collecting component is capable of
being movably sleeved in the light-transmitting channel.

11. The card learning machine according to claim 10,
wherein the light-collecting component comprises:

a light-collecting tube covered on the light-emitting ele-
ment, wherein one end of the light-collecting tube abuts
against the first circuit board, another end of the light-
collecting tube extends into the light-transmitting chan-
nel, and the light-collecting tube and the light-guiding
tube are movably connected; and a connecting plate, connected to the light-collecting tube
and fixedly disposed on the first circuit board.

12. The card learning machine according to claim 4, the
housing comprising:

a first housing, fixedly connected to the mounting plate
and defined with a first assembly port, wherein the
movable cover is movably assembled in the first assem-
bly port;

a second housing, fixedly connected to the first housing,
wherein the fixing frame is fixedly connected to the
second housing, and the second housing is defined with
a second assembly port; and a third housing, provided in the second assembly port and detachably connected to the second housing, wherein the third housing is defined with a viewing window and a pressing window, the viewing window is in communication with the card slot, and the pressing plate is installed in the pressing window.

13. The card learning machine according to claim 12, wherein the second housing is provided with a clamping portion, and the third housing is provided with a clamping joint adapted to the clamping portion; and/or, the second housing is provided with the clamping joint, and the third housing is provided with the clamping portion adapted to the clamping joint.

\* \* \* \* \*